Jan. 8, 1957    V. C. LYNCH    2,776,515
ELECTRIC FISHING REEL
Filed Dec. 9, 1953
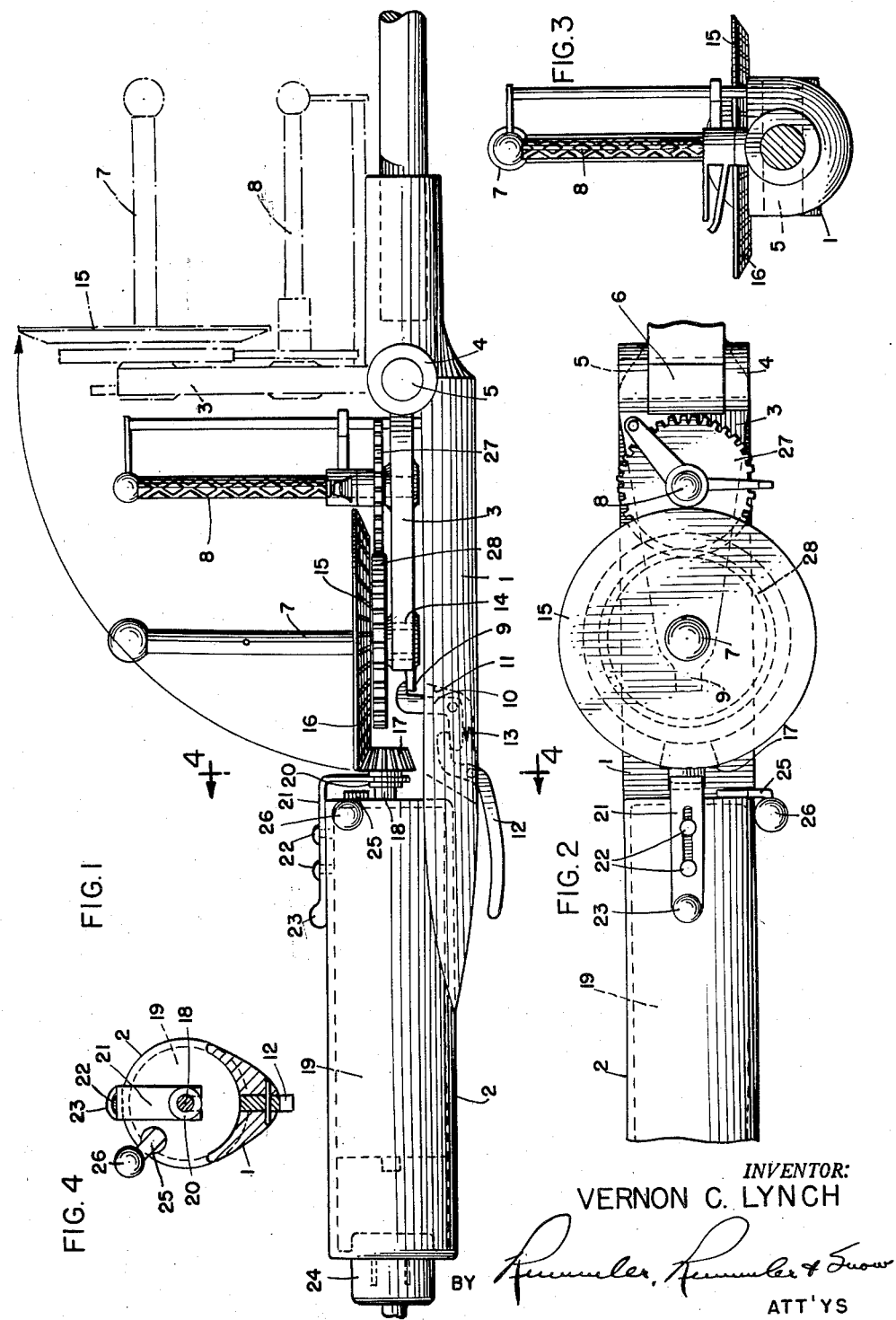
INVENTOR:
VERNON C. LYNCH
ATT'YS ial No. 397,164

2,776,515
ELECTRIC FISHING REEL
Vernon C. Lynch, Waukesha, Wis.

Application December 9, 1953, Serial No. 397,164

4 Claims. (Cl. 43—21)

This invention relates to manual fishing reels suitable for casting, spin fishing, trolling, and other angling uses, and particularly to motor powered fishing reels having reversible drive means for driving the reel spool in either winding or unwinding directions.

The main objects of this invention are to provide an improved fishing reel suitable for either ordinary casting and trolling, as well as for spin fishing operation; to provide an improved motor driven fishing reel; to provide such a reel that may be operated for spin fishing casts and motor rewinding; to provide such a reel that may be operated with a powered line-feed, as well as powered line-rewind; to provide a fishing reel having an improved electric power drive; to provide such a reel in which the power means is wholly contained in the fishing rod handle; to provide an improved fishing reel that may be operated with its spool axis either normal to the rod axis or parallel therewith; to provide such a reel that can be readily and quickly shifted between the normal and parallel positions; to provide such a reel that may be operated with one hand for either spin fishing or ordinary bait casting operations; and to provide an improved motor driven fishing reel that is of light weight and simple construction.

A specific embodiment of this invention is shown in the accompanying drawings, in which:

Figure 1 is a view in horizontal elevation showing a fishing rod having the improved fishing reel, the spin fishing position of the reel spool being shown in dotted outline, and the rod and rod handle being partly broken away.

Fig. 2 is a top plan view of the same showing the reel in position for power driving of the reel spool.

Fig. 3 is a front end view of the same, and

Fig. 4 is a view as taken on line 4—4 of Fig. 1 showing the arrangement of the means for controlling the reel operation.

In the form shown in the drawings, the improved fishing reel is mounted on an offset portion 1 of the handle 2 of a fishing rod, the offset portion 1 providing a base or platform for the reel and means for operatively securing the reel in proper position relative to the rod. The reel itself comprises a bracket member or arm 3 having a pair of laterally spaced eyes or loops 4, at one end hingedly connected by means of a pin 5 to a boss 6, formed at the forward end of the offset handle portion 1, the pin axis extending transversely of the said handle portion and rod.

The bracket or arm 3 carries the reel spool 7, and a level-wind means 8, as well as the gear means for driving these elements as will be hereafter described, and the rearward end of the bracket is provided with a tongue 9 for latching engagement by a catch member 10, in the form of a bell crank pivotally mounted in a suitable slot 11 formed in the handle offset portion 1. The opposite end of the catch 10 is in turn engaged by a lever bar 12, which is also pivotally mounted on the offset portion of the handle, the lever bar 12 being pivoted intermediate its ends and the inner end overlying the rearward arm of the bell crank catch member 10 so as to operatively engage the same to effect release of the catch member from the tongue 9.

The rear end of the lever bar 12 extends beneath the handle 2 and alongside thereof, where it is accessible for operation by the user's finger. Also, a spring means 13 is provided within the slot 11 to normally urge the bell crank or catch member 10 into position for latching engagement with the tongue 9.

As shown, the reel spool 7 is disposed with its axis normal to the plane of the bracket arm 3, and at right angle relative to the axis of the hinge pin 5; and the spool shaft or spindle is journaled in a suitable bearing 14 in the bracket arm 3, so that the spool is freely rotatable thereon. Also, a single end plate 15 is provided on the spool adjacent its journaled end, and the outer end of the spool is left open to facilitate spin casting.

In the form shown, the under surface of the end plate 15 is formed with marginal teeth 16 as a bevel gear, and the end plate is fast on the spool shaft so as to turn therewith. In the ordinary casting position, shown in solid outline in Fig. 1, the marginal teeth 16 on the end plate 15 mesh with a bevel pinion 17 slidably mounted on a shaft projection 18, extending axially forward from the body of the handle 2, the pinion 17 having a splined connection with the shaft 18, so as to be driven thereby. The shaft 18 is in turn driven by an electric motor 19, housed within the handle 2, which is made hollow to receive the motor. As shown, the outwardly projection portion of the shaft 18 is an extension of the main motor shaft on which the rotor of the motor is mounted.

Also, the beveled pinion 17 is provided with an annularly grooved collar 20, on its rearward side, in which the forked end of an operating member 21 is engaged for shifting the pinion 17 axially along the shaft extension 18. As shown, the forked operating member 21 extends upwardly and rearwardly over the top side of the handle where it is slidably attached by headed means, such as rivets 22, projecting from the handle body through a suitable slot in the member 21, the rearward portion of the member 21 extending beyond the slide connection to be accessible by the user's thumb and having a thumb button 23 for easy manipulation.

The motor 19 may be of a type operated from batteries, and the power input connection, into the rod handle 2, may be by means of a female electric plug 24, leading from the power source and plugged into a suitable male receptacle at the end of the handle 2.

Control of the motor 19 is had by means of a rotary switch 25 mounted on the forward end of the handle 2, in a position angularly offset from the lever 21, and having a radially projecting operating knob or lever 26, disposed to be readily accessible for manipulation by the user's thumb. The switch 25 is suitably connected in the usual manner to the motor 19 to not only control its starting and stopping operation but also to control its direction of rotation.

Thus, when the reel bracket 3 is in its latched position, as shown in solid outline in Fig. 1, and the slide 21 is in its retracted position to disengage the spool drive, the reel spool 7 is normally free to turn as in ordinary bait casting operation, and if desired, a suitable drag or click means, not shown, may be incorporated in the structure to prevent backlash. When it is desired to stop the rotation of the reel spool, the bevel pinion 17 may be engaged with the teeth 16 on the bottom side of the end plate 15, by merely pressing forwardly on the rearwardly extending portion of the slide member 21; and when it is desired to drive the reel spool, the motor housed within the handle portion 2 may be operated in the desired direction by manipulation of the switch handle 26. In this manner the reel spool may be driven for the usual rewinding of the line that has been fed out by the cast.

As shown, a suitable level winding means 8 is provided to assure uniform distribution of the line on the reel spool during the rewinding operation, and the rewinding mechanism includes a traveling guide member 29 adapted to travel back and forth along the level wind axis which is parallel with the axis of the spool 7. The fingers of the guide member 29 are preferably of the type in which the line can be readily and quickly engaged or disengaged manually as may be desired.

The level wind mechanism is mounted directly on the reel bracket 3, and is driven by a gear 27, meshed with a driving gear 28, fast on the spool shaft immediately below the end plate 15. Thus any rotation of the reel spool produces a corresponding rotation of the level wind means 8, so that when the line is engaged in the guide fingers 29, during a rewinding operation, uniform distribution of the line on the reel spool will be had. It will be understood that any suitable level wind mechanism may be employed for this purpose so long as the guide fingers of the level wind mechanism are of the type in which the line can be readily engaged, and disengaged, manually during use of the rod and reel for fishing.

When it is desired to use the reel for a spin fishing operation, the reel bracket 3 may be released from the catch 10, by manipulation of the lever 12 with a finger of the hand holding the rod handle, and flipped to the vertical position shown in dotted outline in Fig. 1, in which position the axis of the reel spool will then be disposed parallel with the axis of the fishing rod. For this operation the line is first released from the level wind fingers 29, and the reel bracket 3 is flipped to its vertical position, upon being released from the catch 10, by the movement of the rod when making the cast, and suitable detent means, not shown, in the hinged connection of the bracket 3 with the rod handle, may be provided to frictionally hold the reel bracket 3 in its spin casting position until it is desired to return the reel bracket 3 to its normal position parallel with the rod axis for powered rewinding of the line.

It will be seen that in the spin casting position of the reel, the line is free to unwind spirally in the axial direction of the reel spool, since the forward end of the reel spool is open and unobstructed. Thus any resistance to free turning of the reel spool due to its driving connection with the level wind means 8 will not restrict or inhibit free running of the line off the end of the spool 7, as is desired in the spin casting operation.

The power for operating the electric motor 19 housed within the fishing rod handle may be supplied by suitable batteries carried in the user's coat pocket and connected by a suitable conductor, not shown, to the connection plug 24 engaged in the end of the handle 2. The motor 19 may be of any suitable form to fit within the hollow rod handle 2, and wound for battery power and reversible operation.

The main advantages of the improved fishing reel, and the improved fishing reel and rod combination, reside in the arrangement whereby the reel may be used for either spin fishing or ordinary bait casting operations; and in the arrangement whereby the reel may be power driven, as for rewinding of the line, either to prepare for another cast or to play and pull in a fish that has been caught.

Other advantages reside in the construction whereby the reel driving motor is housed within the rod handle; in the arrangement wherein the motor control and the various operating functions of the reel are controlled by the fingers of the user's hand, which grips the rod handle for manipulation of the rod; and in the arrangement whereby complete operation of the rod and reel for either spin fishing or ordinary bait casting functions, and for power driving of the reel in either its winding or unwinding directions, may be accomplished through the use of only one of the operator's hands.

Still further advantages reside in the novel arrangement of the fishing reel and its mounting on the fishing rod whereby the reel may be used in either of two positions, thereby permitting the use of a single reel for either spin fishing or ordinary bait casting functions; and in the simple construction and arrangement of the heel and the rod handle whereby the weight of the device is minimized.

Although but one specific embodiment of this invention is herein shown and described, it will be understood that details of the construction shown may be altered or omitted without departing from the spirit of this invention, as defined by the following claims.

I claim:

1. The combination with a fishing rod having a handle portion, of a reel comprising a bracket pivotally attached at its forward end to said handle portion on a pivot axis lying at right angles to the rod axis and substantially in a common plane therewith, said bracket being freely swingable about its axis between a rearward position parallel with the rod axis to a forward position normal thereto, a reel spool rotatably mounted by one end on said bracket adjacent the rear end thereof and on an axis at right angles to the pivot axis, releasable latch means for normally holding said bracket in the rearward position relative to the rod axis, reversible motor means on said handle portion engageable with said reel spool for driving said reel spool while said bracket is in a latched position, and means on said handle for releasing said latch means.

2. A fishing reel comprising a bracket member having means for hingedly mounting the same on the handle of a fishing rod and having a hinged axis disposed to be at right angles to the axis of the rod and substantially in a common plane therewith, said hinge axis being at the forward end of said bracket member in relation to the tip of the rod on which the bracket is mounted, a rotatable reel spool having a spindle mounted by one end on said bracket member with its axis at right angles to the hinge axis, and releasable means for latching said bracket member in position to hold said reel spool spindle at right angle with respect to the axis of the rod, said bracket member being freely swingable about the hinge axis by inertial force upon release of the latching means for shifting the spool spindle selectively between a position parallel with the axis of the rod and a position perpendicular thereto, said handle having finger actuated means for releasing said latch means.

3. A fishing reel comprising a fishing rod handle, a bracket member having means for hingedly mounting the same on the handle on a hinge axis disposed adjacent the forward end of the handle in substantially a common plane with and at right angles to the axis thereof, said bracket member being freely swingable by inertial force about its hinge axis between a position parallel with the handle axis and a position at right angles therewith, releasable means on said handle for latching said bracket member at its position parallel with the handle axis, a reel spool rotatably mounted on said bracket member with its axis projecting outwardly at right angles to the axes of the hinge and the handle when said bracket is in latched position, reversible motor means in said handle for driving said spool, and means on said handle for controlling the direction of operation of said motor means.

4. A fishing reel comprising a bracket member having means for hingedly mounting the same on the handle of a fishing rod on an axis disposed forwardly with respect to the handle at right angles to the axis thereof and substantially in a common plane therewith, said bracket member being freely swingable by inertial force in either direction about its hinge axis between a rearward position parallel with the handle and a forward position at right angles therewith, releasable means for latching said bracket member at its position parallel with the handle, a reel spool rotatably mounted on said bracket member with its axis disposed at right angles to the axes of the hinge on the handle when said bracket is in latched position, and finger actuated means mounted on the handle for releasing said latch means.

References Cited in the file of this patent

UNITED STATES PATENTS

| Number | Name | Date |
|---|---|---|
| 491,955 | Singer | Feb. 14, 1893 |
| 1,062,488 | McCluer et al. | May 20, 1913 |
| 2,262,637 | Fanshier | Nov. 11, 1941 |
| 2,283,773 | Teitsma | May 19, 1942 |
| 2,559,215 | Funk | July 3, 1951 |
| 2,634,920 | Dunn | Apr. 14, 1953 |
| 2,652,211 | Hanse | Sept. 15, 1953 |